(12) United States Patent (10) Patent No.: US 7,823,896 B2
VanBelle et al. (45) Date of Patent: Nov. 2, 2010

(54) ARTICULATED STEP SYSTEM FOR AUTOMOTIVE VEHICLE

(75) Inventors: Michael VanBelle, Ypsilanti, MI (US); Louis Caballero, Saline, MI (US); Sven Sauerwein, Woodbridge (CA); David Barrett, Livonia, MI (US)

(73) Assignees: Ford Global Technologies, Dearborn, MI (US); Multimatic, Inc., Markham (CA)

( * ) Notice: Subject to any disclaimer, the term of this patent is extended or adjusted under 35 U.S.C. 154(b) by 700 days.

(21) Appl. No.: 11/421,902

(22) Filed: Jun. 2, 2006

(65) Prior Publication Data

US 2007/0176389 A1 Aug. 2, 2007

Related U.S. Application Data

(60) Provisional application No. 60/743,204, filed on Feb. 1, 2006.

(51) Int. Cl.
*B60R 3/02* (2006.01)

(52) U.S. Cl. ........................................ 280/166; 280/163
(58) Field of Classification Search ................ 180/90.6; 280/763.1–766.1, 163–169
See application file for complete search history.

(56) References Cited

U.S. PATENT DOCUMENTS

| 115,664 | A | * | 6/1871 | Vollhardt ..................... 280/166 |
| 115,665 | A | * | 6/1871 | Wells .......................... 280/166 |
| 588,417 | A | * | 8/1897 | Garstang et al. ............. 105/447 |
| 606,932 | A | * | 7/1898 | Maxon ........................ 105/448 |
| 1,449,031 | A | * | 3/1923 | Blake .......................... 105/445 |
| 2,951,454 | A | * | 9/1960 | Candlin, Jr. .................. 105/447 |
| 3,528,574 | A | * | 9/1970 | Denner et al. ............... 414/558 |
| 3,833,240 | A | * | 9/1974 | Weiler ......................... 280/166 |
| 3,887,217 | A | * | 6/1975 | Thomas ....................... 280/166 |
| 4,020,920 | A | * | 5/1977 | Abbott ......................... 182/19 |
| 4,073,502 | A | | 2/1978 | Frank et al. |
| 4,110,673 | A | * | 8/1978 | Magy et al. .................. 318/466 |
| 4,116,457 | A | * | 9/1978 | Nerem et al. ................ 280/166 |
| 4,162,098 | A | * | 7/1979 | Richardson, III ........... 296/39.2 |
| 4,180,143 | A | * | 12/1979 | Clugston ..................... 182/91 |
| 4,188,889 | A | * | 2/1980 | Favrel ......................... 105/445 |
| 4,231,583 | A | * | 11/1980 | Learn .......................... 280/166 |
| 4,275,664 | A | * | 6/1981 | Reddy ......................... 105/430 |
| 4,592,583 | A | * | 6/1986 | Dresen et al. ............... 296/39.2 |
| 4,623,160 | A | | 11/1986 | Trudell |
| 4,964,771 | A | * | 10/1990 | Callihan ...................... 410/118 |
| 4,982,974 | A | * | 1/1991 | Guidry ........................ 280/164.2 |
| 5,085,450 | A | * | 2/1992 | DeHart, Sr. .................. 280/166 |
| 5,257,847 | A | * | 11/1993 | Yonehara ..................... 296/151 |
| 5,338,136 | A | * | 8/1994 | Hetchler ...................... 410/100 |

(Continued)

*Primary Examiner*—Lesley Morris
*Assistant Examiner*—Jacob Meyer
(74) *Attorney, Agent, or Firm*—Jerome R. Drouillard; Greg P. Brown

(57) ABSTRACT

An articulated step system for an automotive vehicle includes a step housing attached to the vehicle frame by means of at least one standoff bracket and a tension strut extending generally downwardly from a first end attached to a vehicle body to a second end attached to the step housing. The articulated step has a stowed position generally underlying the body, and a deployed position extending generally outwardly from the body. Movement of the step may be either translational or rotational with respect to the step housing. In one embodiment, the step extends for the full length of the cab of the vehicle, and partially under a load carrying body at the rear of the vehicle.

11 Claims, 11 Drawing Sheets

U.S. PATENT DOCUMENTS

| | | | |
|---|---|---|---|
| 5,498,012 A * | 3/1996 | McDaniel et al. | 280/166 |
| 5,511,750 A | 4/1996 | Evenson | |
| 5,547,040 A * | 8/1996 | Hanser et al. | 182/88 |
| 5,716,064 A | 2/1998 | Frerichs | |
| 5,800,106 A * | 9/1998 | Miller | 410/117 |
| 5,842,709 A * | 12/1998 | Maccabee | 280/166 |
| 5,895,064 A | 4/1999 | Laubach | |
| 5,941,342 A * | 8/1999 | Lee | 182/95 |
| 5,957,237 A * | 9/1999 | Tigner | 182/127 |
| 6,036,208 A * | 3/2000 | Frerichs | 280/166 |
| 6,082,751 A * | 7/2000 | Hanes et al. | 280/163 |
| 6,168,176 B1 * | 1/2001 | Mueller | 280/163 |
| 6,213,486 B1 * | 4/2001 | Kunz et al. | 280/166 |
| 6,460,915 B1 | 10/2002 | Bedi et al. | |
| 6,530,730 B2 * | 3/2003 | Swensen | 410/106 |
| 6,533,303 B1 * | 3/2003 | Watson | 280/166 |
| 6,641,158 B2 * | 11/2003 | Leitner | 280/166 |
| 6,659,224 B2 | 12/2003 | Medsker | |
| 6,663,125 B1 * | 12/2003 | Cheng | 280/166 |
| 6,783,311 B2 * | 8/2004 | Sauerwald | 410/97 |
| 6,830,257 B2 | 12/2004 | Leitner | |
| 6,834,875 B2 | 12/2004 | Leitner et al. | |
| 6,908,269 B1 * | 6/2005 | Youngs et al. | 410/100 |
| 6,926,295 B2 * | 8/2005 | Berkebile et al. | 280/166 |
| 6,938,909 B2 * | 9/2005 | Leitner | 280/166 |
| 6,942,233 B2 * | 9/2005 | Leitner et al. | 280/166 |
| 6,955,370 B2 * | 10/2005 | Fabiano et al. | 280/163 |
| 7,007,961 B2 * | 3/2006 | Leitner et al. | 280/166 |
| 7,017,927 B2 * | 3/2006 | Henderson et al. | 280/166 |
| 7,055,839 B2 * | 6/2006 | Leitner | 280/166 |
| 7,090,449 B1 * | 8/2006 | Hugg | 410/102 |
| 7,118,120 B2 * | 10/2006 | Lee et al. | 280/166 |
| 7,163,221 B2 * | 1/2007 | Leitner | 280/166 |
| 7,287,771 B2 * | 10/2007 | Lee et al. | 280/166 |
| 7,318,596 B2 * | 1/2008 | Scheuring et al. | 280/166 |
| 7,367,574 B2 * | 5/2008 | Leitner | 280/166 |
| 7,377,531 B2 * | 5/2008 | Fabiano et al. | 280/163 |
| 7,380,807 B2 * | 6/2008 | Leitner | 280/166 |
| 7,398,985 B2 * | 7/2008 | Leitner et al. | 280/166 |
| 7,413,204 B2 * | 8/2008 | Leitner | 280/163 |
| 7,413,205 B2 * | 8/2008 | Watson | 280/166 |
| 7,441,790 B2 * | 10/2008 | Lechkun | 280/166 |
| 7,445,221 B2 * | 11/2008 | Kobayashi | 280/166 |
| 2002/0012576 A1 * | 1/2002 | Anderson | 410/106 |
| 2002/0079668 A1 * | 6/2002 | Farkash | 280/163 |
| 2003/0132595 A1 | 7/2003 | Fabiano et al. | |
| 2003/0184040 A1 * | 10/2003 | Leitner et al. | 280/166 |
| 2004/0076487 A1 * | 4/2004 | Sauerwald | 410/97 |
| 2004/0084868 A1 * | 5/2004 | Leitner et al. | 280/166 |
| 2004/0100063 A1 * | 5/2004 | Henderson et al. | 280/166 |
| 2004/0108678 A1 * | 6/2004 | Berkebile et al. | 280/166 |
| 2004/0124601 A1 * | 7/2004 | Leitner | 280/166 |
| 2005/0077697 A1 * | 4/2005 | Leitner | 280/166 |
| 2005/0087951 A1 | 4/2005 | Leitner et al. | |
| 2005/0104318 A1 * | 5/2005 | Lee et al. | 280/166 |
| 2005/0151340 A1 * | 7/2005 | Leitner | 280/166 |
| 2005/0163582 A1 * | 7/2005 | Roh | 410/106 |
| 2005/0173886 A1 * | 8/2005 | Leitner | 280/166 |
| 2005/0179227 A1 * | 8/2005 | Leitner | 280/163 |
| 2005/0258616 A1 | 11/2005 | Scheuring et al. | |
| 2005/0280242 A1 * | 12/2005 | Fabiano et al. | 280/164.1 |
| 2006/0091638 A1 * | 5/2006 | Leitner et al. | 280/166 |
| 2006/0125204 A1 * | 6/2006 | Leitner et al. | 280/166 |
| 2006/0163836 A1 * | 7/2006 | Kobayashi | 280/166 |
| 2006/0202441 A1 * | 9/2006 | Leitner | 280/163 |
| 2006/0255558 A1 * | 11/2006 | Okuyama | 280/166 |
| 2007/0069497 A1 * | 3/2007 | Watson | 280/166 |
| 2007/0108720 A1 * | 5/2007 | Leitner | 280/166 |
| 2007/0176389 A1 * | 8/2007 | VanBelle et al. | 280/166 |
| 2008/0246244 A1 * | 10/2008 | Watson | 280/166 |

* cited by examiner

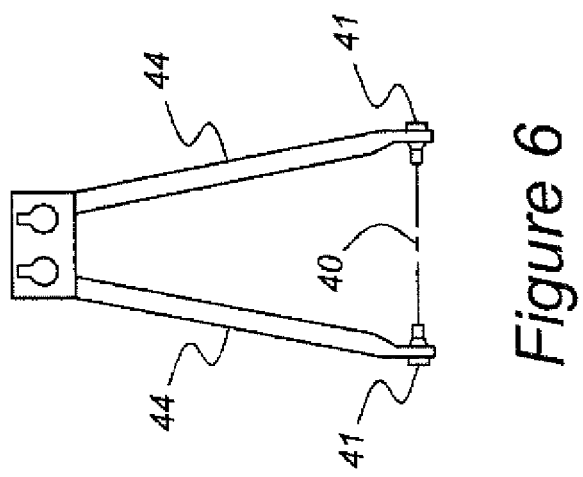
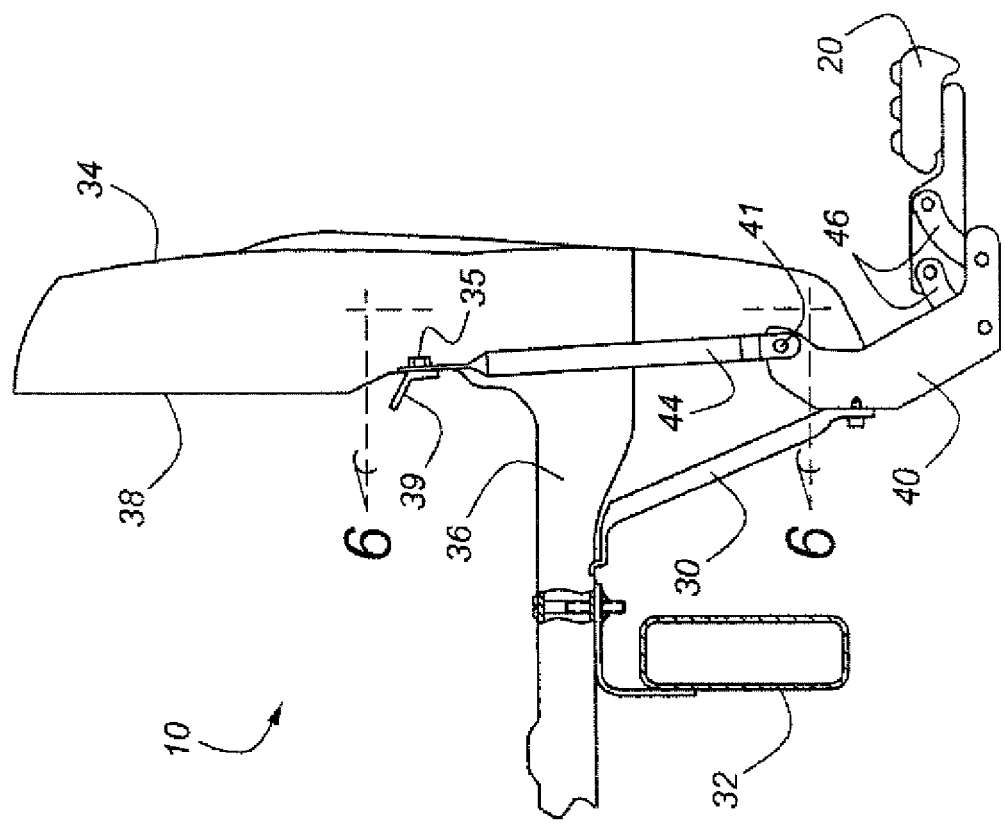

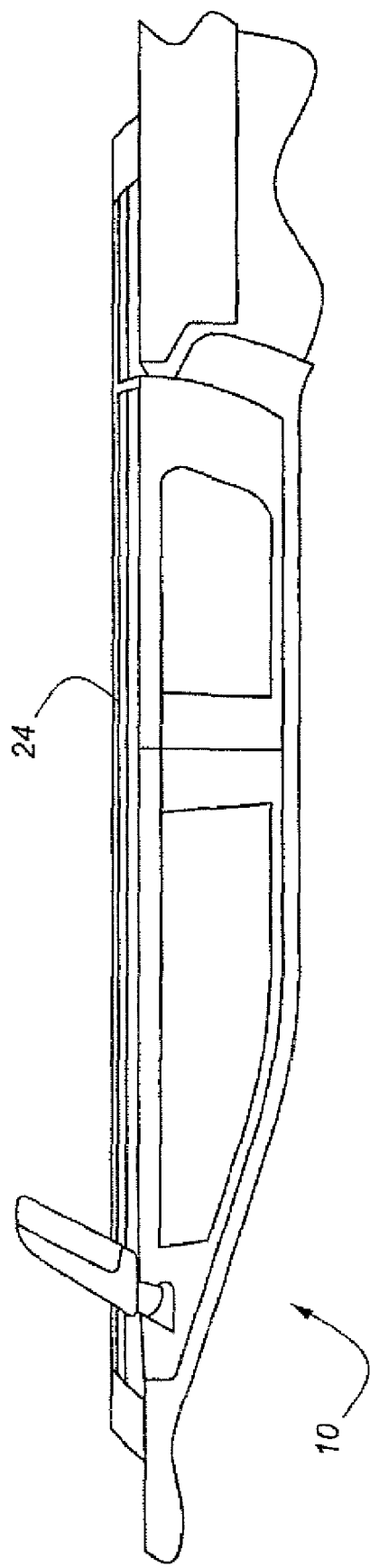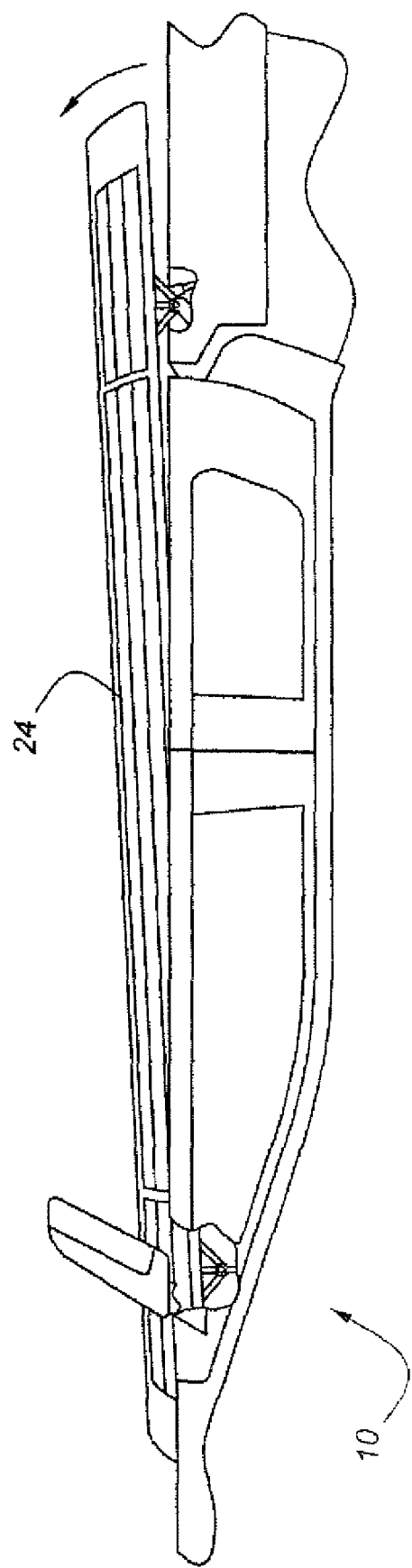
Figure 8a
Figure 8b

ARTICULATED STEP SYSTEM FOR AUTOMOTIVE VEHICLE

CROSS-REFERENCE TO RELATED APPLICATIONS

The present application claims priority to U.S. provisional patent application 60/743,204 filed Feb. 1, 2006, and entitled "Articulating Box Access Step", the disclosure of which is incorporated by reference herein.

BACKGROUND OF THE INVENTION

The present invention relates to a deployable step for accessing a portion of a vehicle, such as the interior of the cargo box of a pickup truck.

Utility vehicles, particularly pickup trucks, are used for a wide variety purposes, including the transportation of tradesmen's tools. Such tools are frequently carried in toolboxes mounted at the front of a pickup truck's bed. Unfortunately, pickup trucks are often quite tall, particularly 4×4 trucks, trucks with large wheel/tire combinations, and trucks that are particularly suited to off-road use. Thus, designers have a tended to develop steps allowing access over the sides of pickup trucks to items carried within the bed. Such steps can also be used on other types of utility bodies to access even exterior mounted toolboxes, or welding generators, compressors, and other devices mounted at an upper portion of a utility body.

U.S. Pat. Nos. 6,533,303 and 6,663,125 disclose steps for use with utility vehicles such as pickup trucks. System of the '303 patent suffers from the fact that its mounting is accomplished by a single bracket bolted to the frame of a vehicle. Such a mounting may be lacking in terms of its ability to handle the moment created by the weight of an individual upon the step; this limits the usefulness of the step shown in the '303 patent. The mounting shown in the '125 patent, is suspended from the rocker panel of a body using sheet metal screws. An adjustable bracket bears upon the frame of the vehicle but only in compression. As a result, the load carrying capability and robustness of the step shown in the '125 patent is limited.

An articulated step system for an automotive vehicle according to the present invention solves the problems with known prior art steps by employing the strongest structures of the vehicle to not only support the step system in shear, but also to avoid problems with the moment created by the weight of a person.

SUMMARY OF THE INVENTION

A step according to the present invention has a stowed position generally underlying the body of a vehicle and a deployed position extending generally outwardly from the body. The step's housing is attached to a standoff bracket mounted to a frame member of the vehicle. A tension strut extends generally downwardly from a first end attached to the vehicle body to a second end attached to the step housing. The step housing is attached to the frame member preferably by a plurality of standoff brackets, with the tension strut being attached to the step housing mediate the positions at which the standoff brackets are attached to the step housing.

The present step may be articulated to the step housing by means of a four bar linkage, or by means of a simple pivot joint, or by other types of mechanisms known to those skilled in the art and suggested by this disclosure. If a four bar linkage is used, the motion of the step with respect to the step housing will be translational. In one embodiment, the step extends longitudinally from the step housing to a second articulation point forward of the step housing, such that the step will be caused to rotate about the second articulation point when the step articulates with respect to the step housing. As noted above, the step is articulated for movement in a direction generally parallel to the surface upon which the vehicle is operating. The frame member that the frame brackets are mounted to may comprise either a longitudinally extending frame rail, or a frame cross member. In order to promote manufacturing of the present articulated step system, the first or upper end of the tension strut supporting the step housing may be attached to a fastener extending through an inner panel of the body, such as the inner panel of a pickup truck box. As a convenience, the fastener extending through the pickup box inner panel may be used to mount a cargo hold down situated within the pickup box.

Standoff brackets used with the present system preferably comprise cantilever brackets, which handle the majority of the shear load imposed by a person standing upon the present step system. The moment caused by the cantilevering is handled and accommodated by means of the previously described tension strut.

With an extended step system according to the present invention, a front step mount permits the rotation of a step about a generally vertically axis, and a rear step housing allows the rear portion of the step to move out translationally from the vehicle, through the use of a motor driven self-storing paired link. In this manner, a longer step may be articulated so as to extend generally outwardly from the vehicle body at an acute angle.

It is an advantage of the present articulated step system that the design and styling of the step may be rendered in a fashion consistent with an existing step bar used in a vehicle such as a pickup truck.

It is a further advantage of a step system according to the present invention that this system may be installed readily in a vehicle during the vehicle's assembly process, thereby allowing the vehicle, including the step, be delivered to a dealership, and even to the ultimate consumer, without any intervening assembly action.

It is a further advantage of a system according to the present invention that the articulated step may be employed not only as a smaller step extending wholly under a vehicle body, for example, of a pickup truck, but also as a longer step extending from the front part of a vehicle to a position underneath the pickup box of the vehicle.

Other advantages, as well as features and objects of the present invention, will become apparent to the reader of this specification.

BRIEF DESCRIPTION OF THE DRAWINGS

FIG. 5 shows another embodiment of a system according to the present invention, in which a standoff bracket is attached to a cross member of a pickup truck box.

FIG. 6 shows a plurality of tension struts according to one aspect of the present invention. FIG. 6 is taken along the lines 6-6 of FIG. 5.

FIGS. 8a and 8b illustrate the full-length step FIG. 7 in the stowed and deployed positions, respectfully.

DETAILED DESCRIPTION OF THE PREFERRED EMBODIMENTS

Figure 1:
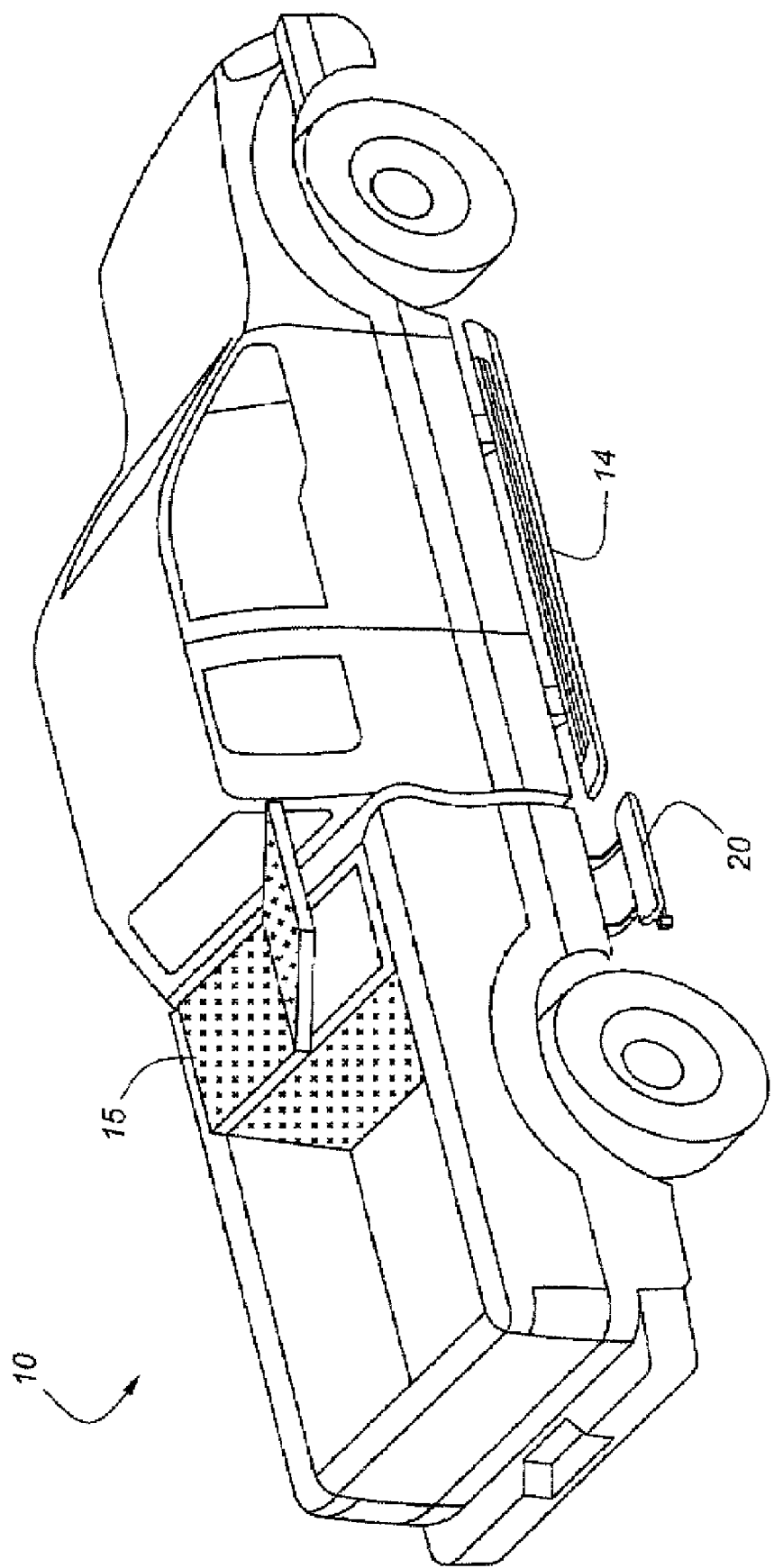
FIG. 1 is a perspective view of a vehicle having an articulated step system according to the present invention.
Figure 2:
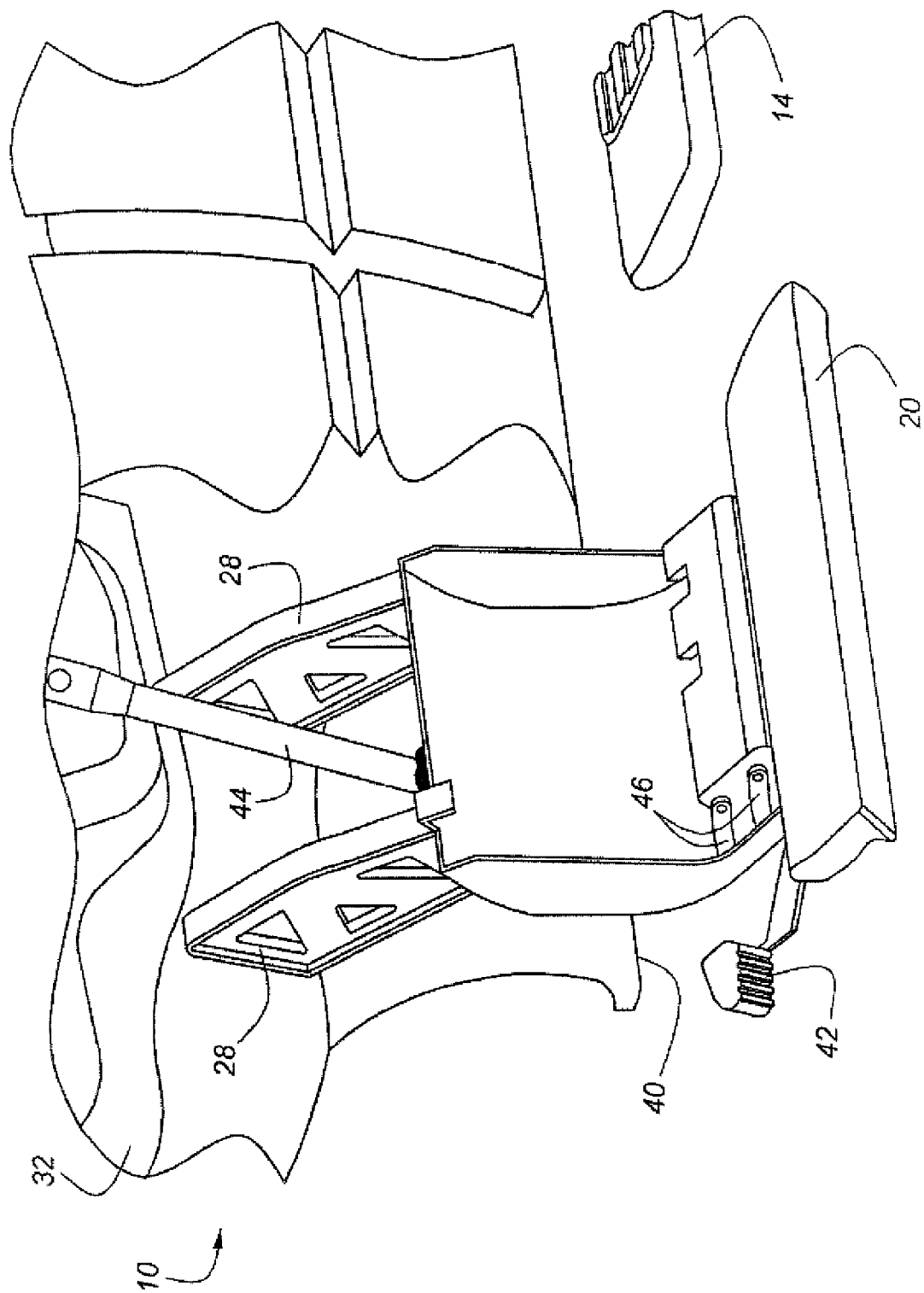
FIG. 2 shows one embodiment of a step system according to the present invention in an open position.

As shown in FIG. 1, vehicle 10 has a main step, 14, and an articulated step, 20. Step 20 is shown in an unfolded, or deployed, position in FIG. 2. While in the deployed position, step 20 provides ready access to toolbox 15. Step 20 is mounted to step housing 40 by means of four linkage bars, 46, which are pivoted to step housing 40 and to step 20. Two of links 46 are illustrated in FIG. 2. A motorist uses pedal lever 42 to move step 20 from its stored position to its deployed position. Step housing 40 is mounted to vehicle 10 by means of standoff brackets and a tension strut. Standoff brackets 28, extend generally laterally between housing 40 and frame rail 32, which itself extends generally longitudinally along vehicle 10 under the vehicle's body. Tension strut 44 is interposed between housing 40 and a location on the vehicle's body, which is discussed in greater detail below. As used herein, the term "housing" means either a partial enclosure as shown in FIGS. 2 and 3, or a more skeletal enclosure, such as that shown in FIGS. 11a, 11b, and 12.

Figure 3:
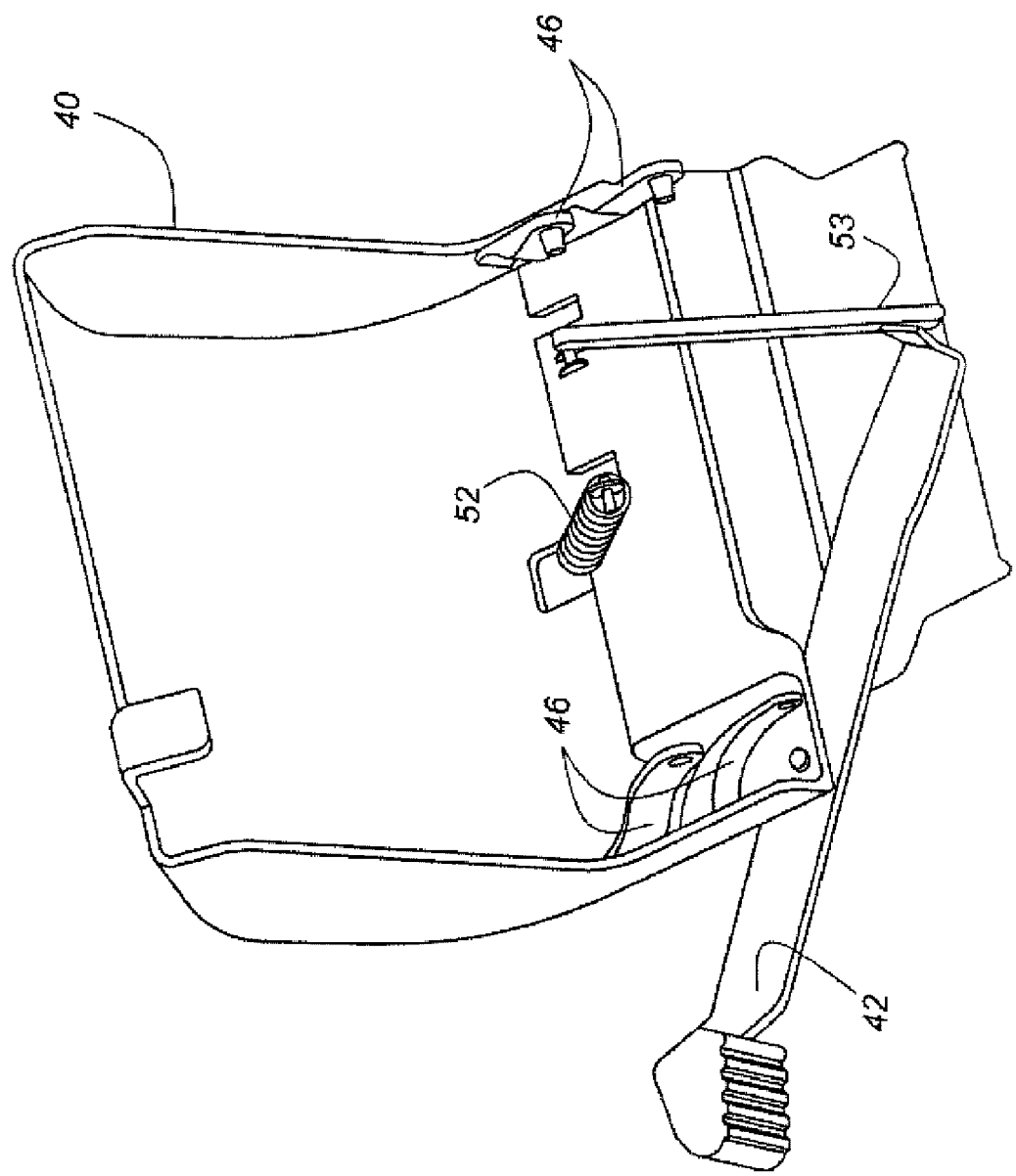
FIG. 3 illustrates a portion of the system shown in FIG. 2, including an actuation mechanism.

FIG. 3 illustrates greater detail of one embodiment of the present articulated step in which linkage bars 46 are shown as being pivoted to housing 40. Pedal 42 has a connecting link 53 which mounts to underside of step 20 (not shown) to move step 20 outwardly into its deployed position by swinging linkage bars 46.

Figure 4A:
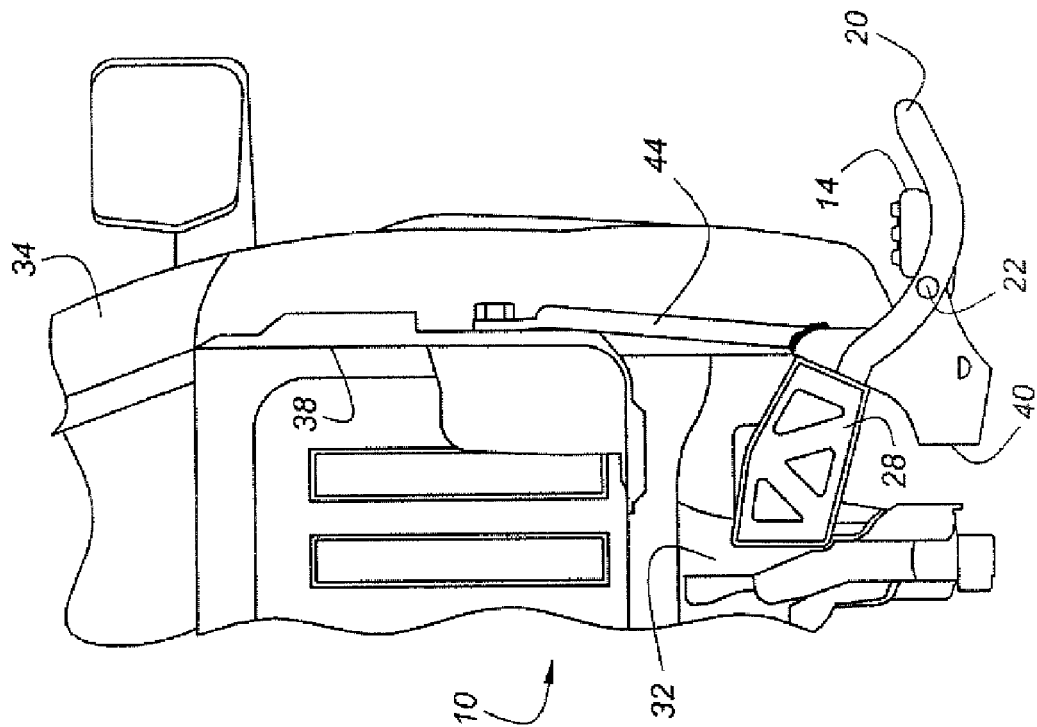
FIG. 4a illustrates a single pivot step system according to the present invention, in its stowed position.
Figure 4B:
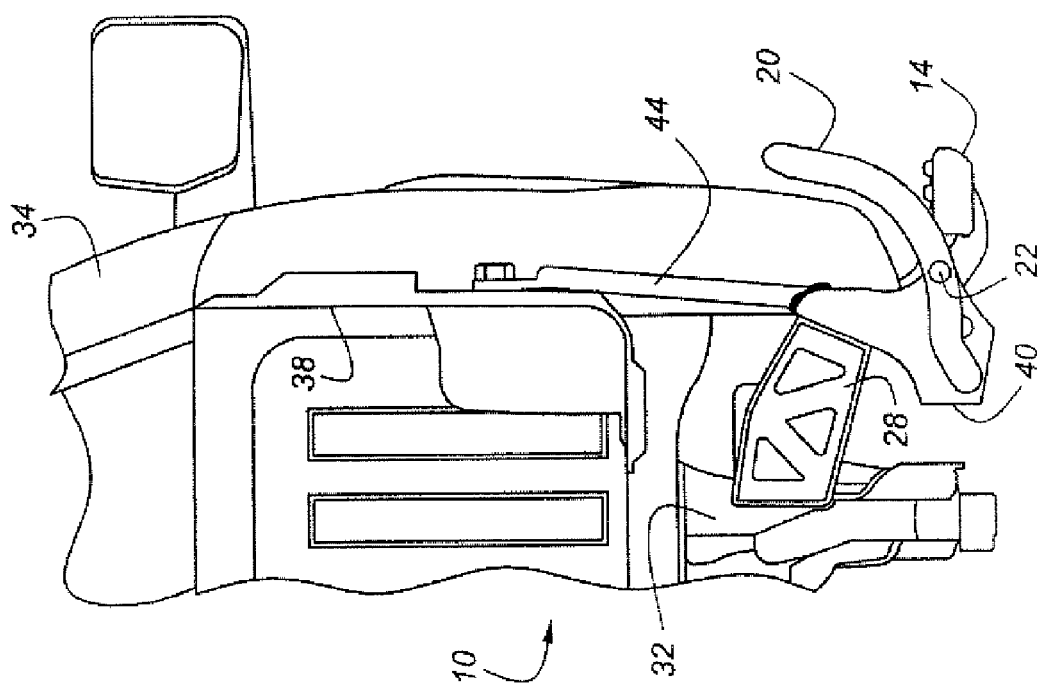
FIG. 4b illustrates the single pivot step system of FIG. 4a in its deployed position.

FIGS. 4a and 4b illustrate additional details of the mounting provisions of the present step. Standoff brackets 28 are shown as extending laterally between frame rail 32 and step housing 40. In the embodiment of FIGS. 4a and 4b, step 20 is a single pivot step which pivots about axis 22. FIG. 4b shows step 20 in its deployed position. FIGS. 4a and 4b also detail tension strut 44, which has a first, or upper, end attached to inner panel 38 of pickup box 34. This construction is shown with further detail in FIG. 5, wherein two tension struts 44 are applied to opposite ends of step housing 40 by means of fasteners 41 (see also FIG. 6). Struts 44 are attached to pickup box inner panel 38 by means of fasteners 35 extending through a cargo tiedown, or hold down anchor, 39 (see also FIGS. 4a and 4b). Cargo anchor 39 is bolted, by means of fastener 35, onto an inner surface of pickup box inner panel 38. Note also from FIG. 5, that standoff bracket 30 is attached to frame cross member 36. FIG. 5 also shows step 20 mounted on linkage bars 46 and in the fully deployed or extended position. A savings in both labor time and component cost is achieved because tension struts 44 are attached at their upper ends with fasteners 35, which attach hold down 39.

The lower end of tension strut 44 may be attached to step housing 40 by means of welding 51 (FIGS. 2, 4a and 4b), or by a mechanical fastener such as a bolt or rivet (FIGS. 5 and 6).

Figure 7:
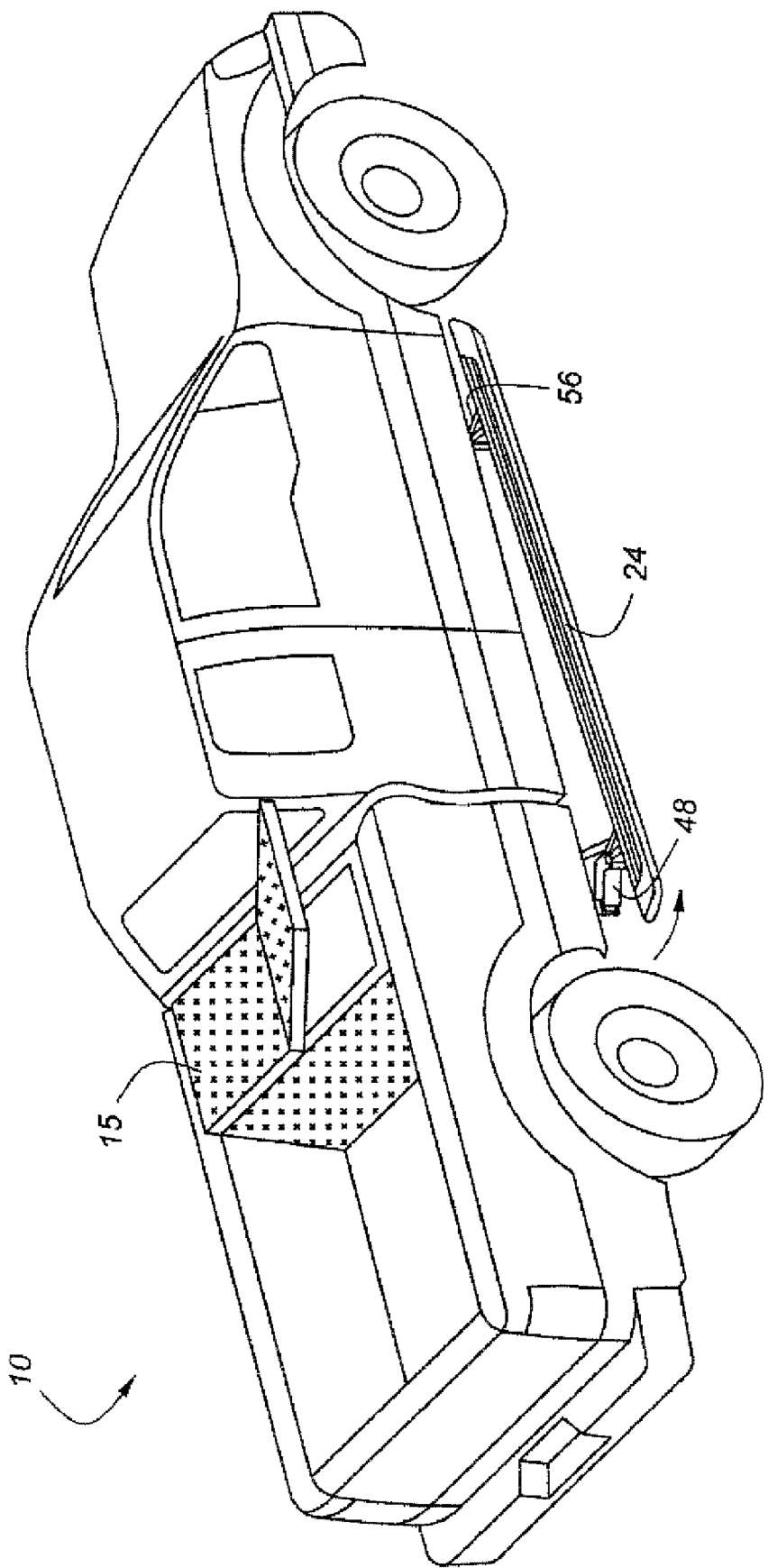
FIG. 7 is a perspective view of a vehicle having a full-length step system according to the present invention.
Figure 10:
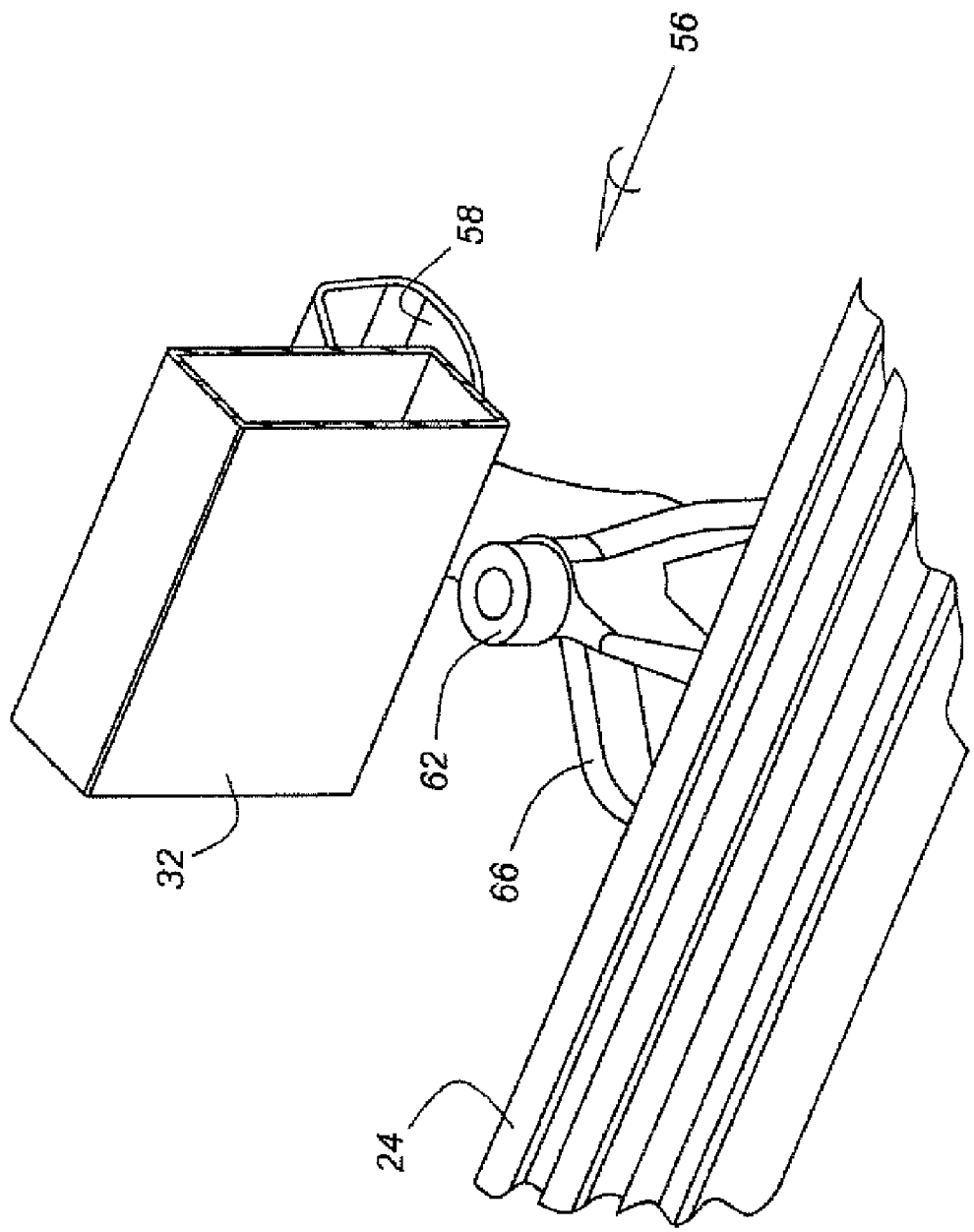
FIG. 10 illustrates a front step mount for the step illustrated in FIGS. 7, 8 and 9.

FIG. 7 illustrates a vehicle having a rotatably mounted, full-length step, 24, which is shown in FIG. 7 as fully deployed. Step 24 is shown in plan view in a fully retracted, or stowed, position in FIG. 8a and fully extended, or deployed, position in FIG. 8b. The leading portion of step 24 is attached to vehicle 10 by means of front mount 56, which is shown in detail in FIG. 10. Mount 56 includes a front standoff bracket, 58, incorporating a pivot, 62. Step board bracket 66, is journaled to standoff bracket 58 by mean of pivot 62. Step board 24 is mounted to bracket 66.

Figure 9:
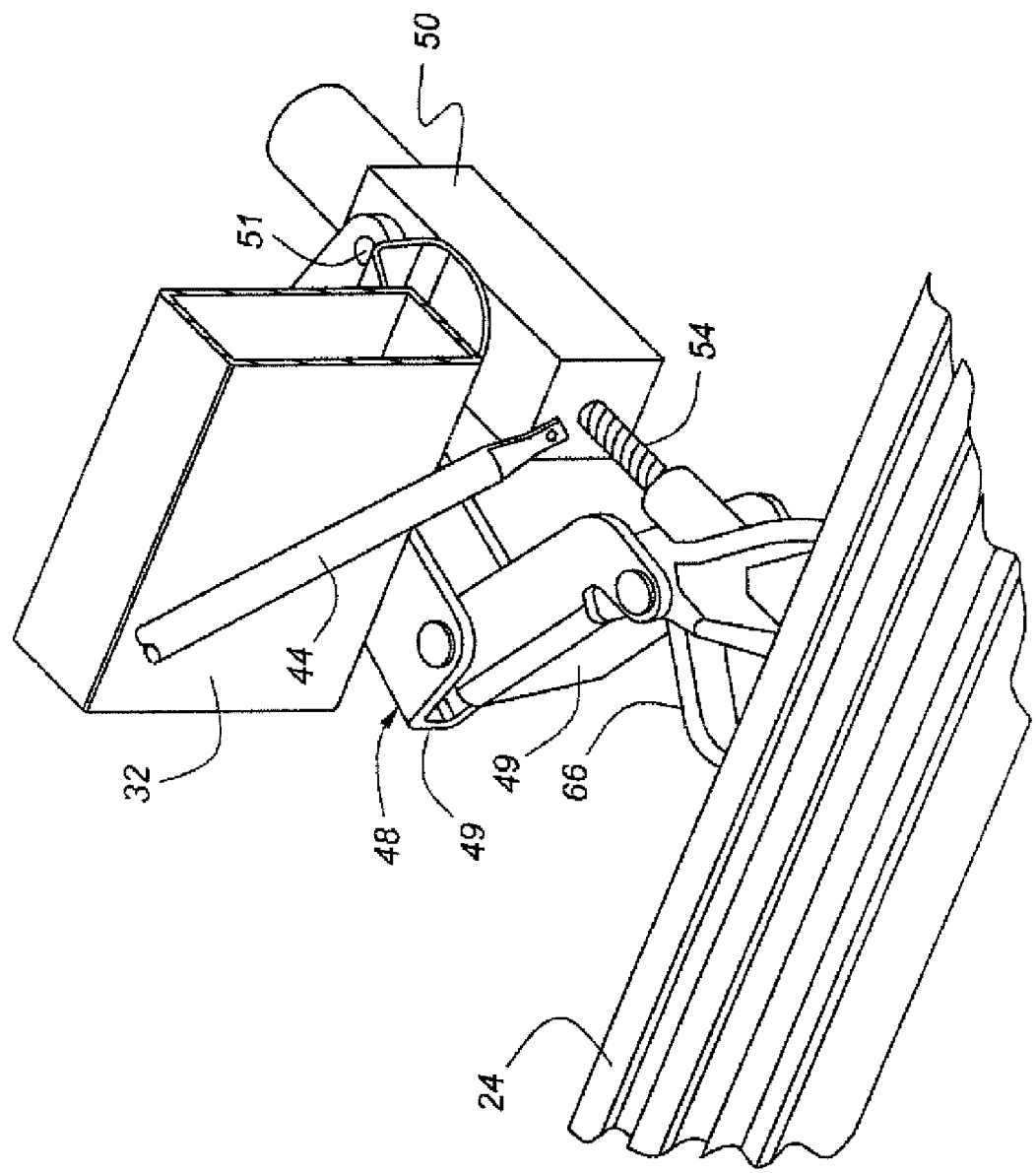
FIG. 9 illustrates a rear step housing used with the step system of FIGS. 7 and 8.

The trailing portion of step board 24 is attached to vehicle 10 by means of motor driven self-storing paired link housing 48, which is shown in FIG. 9 as having two paired links, 49, driven by lead screw 54 and motor 50 such that as motor 50 is operated, lead screw 54 pushes board bracket 66 outboard along with the trailing portion of board 24, causing board 24 to rotate about pivot 62 carried by front standoff bracket 58. The inboard portion of links 49 pivots upon a bushing, 51, carried upon the housing of motor 50. As lead screw 54 moves outboard, paired links 49, which comprise an integral, self-storing hinge and mount housing for board 24, are caused to swing outboard. In this manner, step board 24 assumes the position shown in FIG. 8B. Step board 24 is shown as forming an acute angle with respect to the body side of vehicle 10. Tension strut 44 reacts to the moment caused by the combined weight of step board 24 and a motorist standing on step board 24.

Figure 11B:
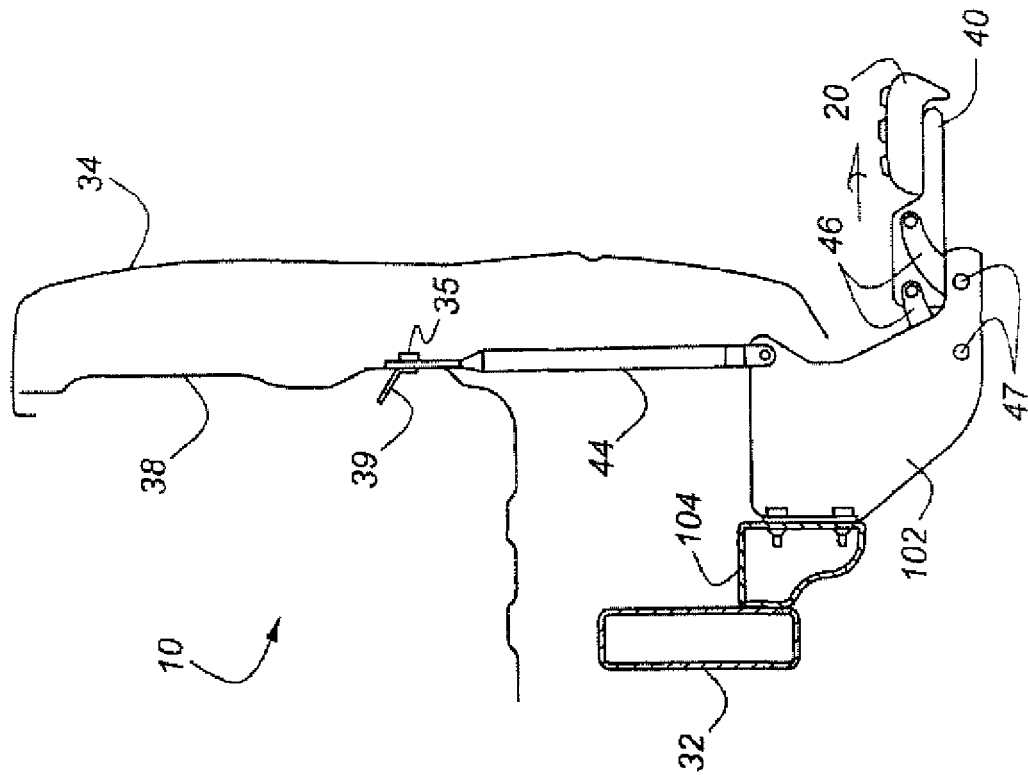
FIG. 11b illustrates the four bar parallelogram linkage step system of FIG. 11a in its deployed position.
Figure 11A:
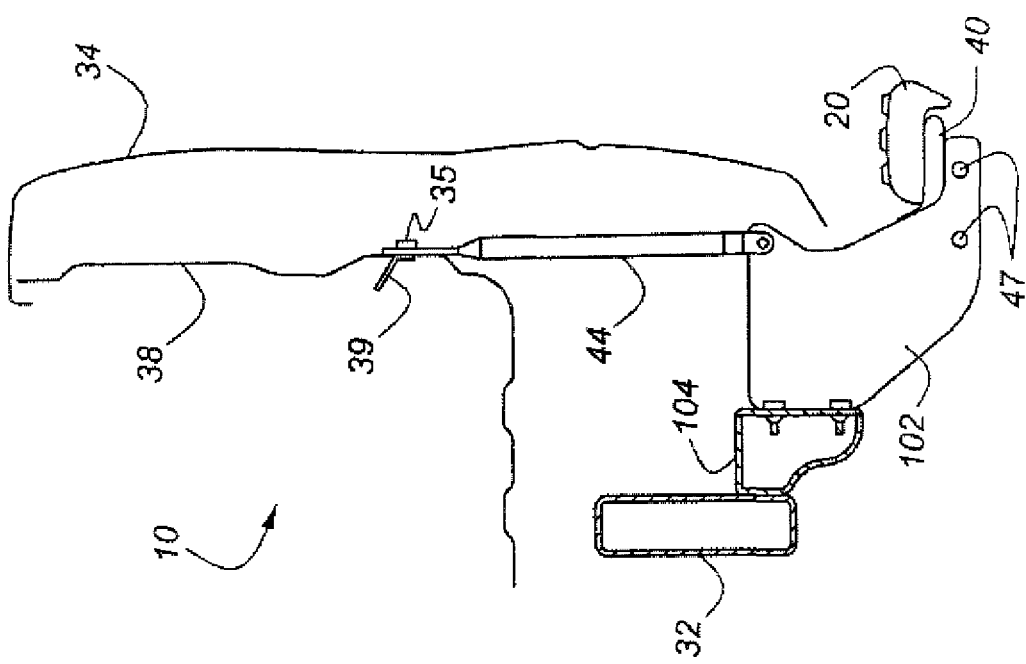
FIG. 11a illustrates a four bar parallelogram linkage step system according to the present invention, in its stowed position.

FIGS. 11a and 11b, respectively, illustrate the closed and deployed positions of an embodiment in which step 20 is articulated to a pair of brackets 102 by means of parallelogram bars 46, which are pivotably mounted to brackets 102 by pivots 47. Brackets 102 are mounted to the vehicle by means of standoff brackets 104 and tension struts 44. Brackets 102 function as a skeletal housing for step 20 and linkage bars 46.

Figure 12:
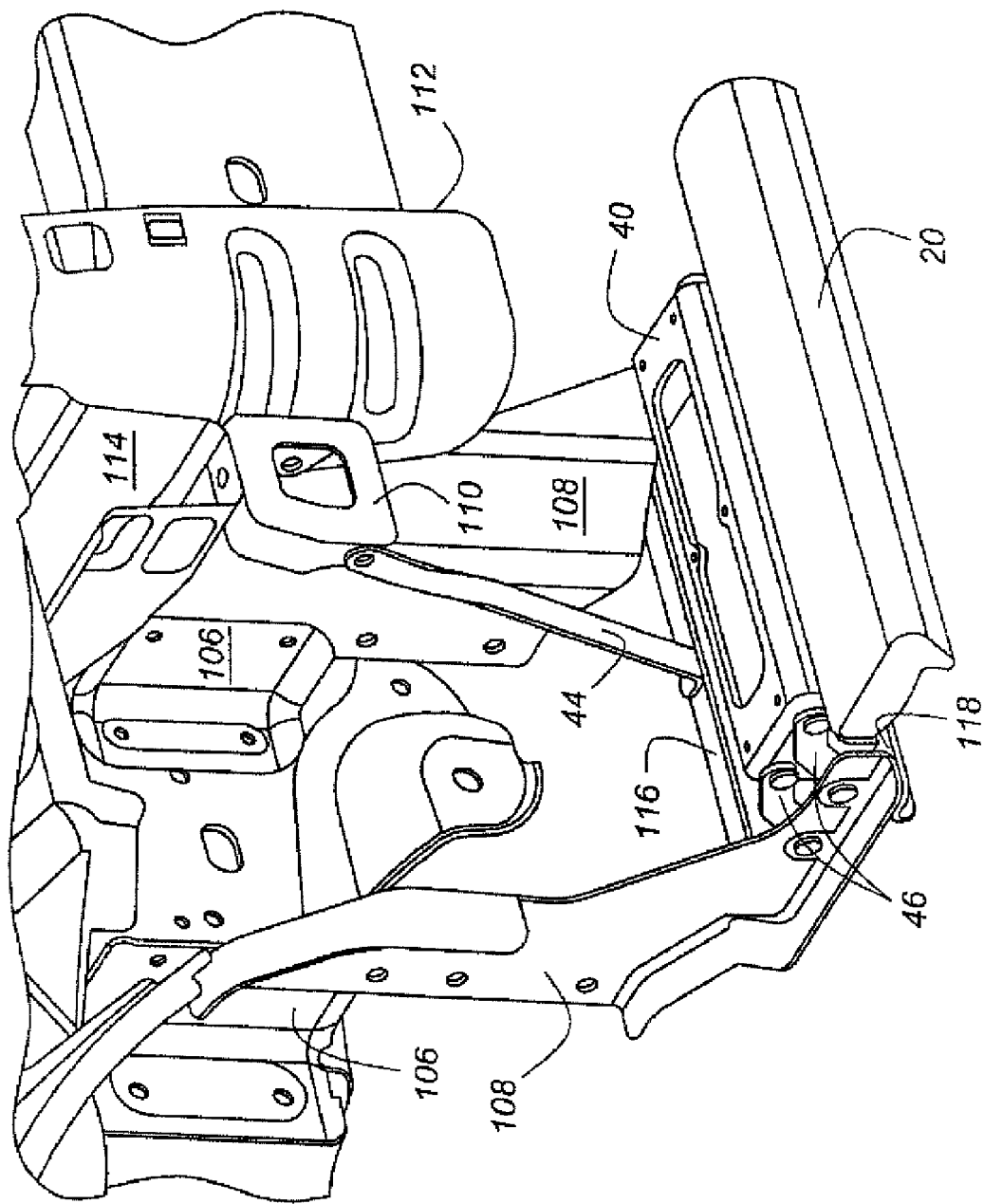
FIG. 12 illustrates another embodiment of a four bar parallelogram linkage step system according to the present invention.

FIG. 12 shows another embodiment according to the present invention in which step 20 is mounted to vehicle 10 by means of linkage bars 46, which are in turn supported by opposed cantilever brackets 108 and standoff brackets 106. Rails 116 and 118 are welded to cantilever brackets 108. Tension strut 44 is attached at its lower end to rail 116 and at its upper end to bracket 110, which is fastened to both pickup box cross member 114 and pickup box reinforcement 112.

An additional advantage of the present articulated step system resides in the ability for the step to have a higher position while in the deployed position, as opposed to a lower position, closer to the ground surface upon which the vehicle is being operated, while the step is in the stowed position. As may been from FIGS. 1-5 and 11a, 11b, and 12, the linkage employed for the purpose of mounting the present step may easily be formatted to permit the step to move outward and in an upward manner when it is deployed thereby positioning a user in an ideal position to access the inside of a truck bed.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An articulated step system for an automotive vehicle, comprising:

at least one standoff bracket attached to a frame member of said vehicle;

a step housing attached to said standoff bracket;

a tension strut extending generally downwardly from a first end attached to a vehicle body to a second end attached to said step housing, wherein said frame member comprises a longitudinally extending frame rail, and said vehicle body comprises an inner panel of a pickup box, wherein a fastener extends through said first end of said tension strut, said inner panel, and a cargo hold down mounted within said pickup box; and a step articulated to said step housing, with said step having a stowed position generally underlying said body, and a deployed position extending generally outwardly from said body.

2. An articulated step system according to claim 1, wherein said step housing is attached to the frame member by means of a plurality of standoff brackets, with said tension strut being attached to said step housing mediate the positions at which said standoff brackets are attached to the step housing.

3. An articulated step system according to claim 1, wherein said step is articulated to said step housing by means of a four bar linkage.

4. An articulated step system according to claim 1, wherein said step is articulated to said step housing by means of a four bar linkage, such that the motion of said step with respect to said step housing is translational.

5. An articulated step according to claim 1, wherein said step extends longitudinally from said step housing to a second articulation point forward of said step housing, whereby the step will be caused to rotate about the second articulation point when the step articulates with respect to the step housing.

6. An articulated step system according to claim 1, wherein said step is articulated for movement in a direction generally parallel to a surface upon which the vehicle is operating.

7. An articulated step system according to claim 1, wherein said standoff bracket comprises a cantilever bracket.

8. An articulated step system according to claim 1, further comprising a foot operated means for moving said step from said stowed position to said deployed position.

9. An articulated step system for an automotive vehicle, comprising:

a plurality of opposed cantilever brackets adapted for mounting to a vehicle frame member;

at least one tension strut adapted to extend generally downwardly from a vehicle body structure to a rail extending between said cantilever brackets, wherein at least one fastener extends through said at least one tension strut, a sidewall of a cargo box, and a cargo hold down fixture mounted within said pickup box so as to fasten said cargo hold down fixture to the cargo box; and a step articulated to said cantilever brackets, with said step being movable between a stowed position and a deployed position.

10. An articulated step system according to claim 9, wherein said step is articulated to said cantilever brackets by means of a parallelogram linkage.

11. An articulated step system according to claim 9, wherein movement of said step from said stowed position to said deployed position is accomplished by means of a foot-actuated lever.

\* \* \* \* \*